Feb. 1, 1966 F. E. BUSCHBOM 3,232,418
SILO UNLOADER STRUCTURE
Original Filed July 5, 1961 3 Sheets-Sheet 2

INVENTOR.
FLOYD E. BUSCHBOM
BY
Moore, White & Bund
ATTORNEYS

Feb. 1, 1966  F. E. BUSCHBOM  3,232,418
SILO UNLOADER STRUCTURE
Original Filed July 5, 1961  3 Sheets-Sheet 3

INVENTOR.
FLOYD E. BUSCHBOM
BY Moore, White & Burd
ATTORNEYS

United States Patent Office 3,232,418
Patented Feb. 1, 1966

3,232,418
SILO UNLOADER STRUCTURE
Floyd E. Buschbom, Long Lake, Minn., assignor to Vandale Corporation, Long Lake, Minn., a corporation of Minnesota
Original application July 5, 1961, Ser. No. 121,954, now Patent No. 3,138,267, dated June 23, 1964. Divided and this application July 18, 1963, Ser. No. 295,911
3 Claims. (Cl. 198—213)

This invention comprises new and useful improvements in silo unloaders or the like of the type generally disclosed in my United States Patent 2,794,560. Specifically this invention relates to improved discharge structure for conveying material from a silo or the like.

This application is a division of United States Serial No. 121,974, filed July 5, 1961, now Patent No. 3,138,267.

A novel feature of this invention is the provision of a bearing for the discharge auger at only the intake end of the conveyor trough thereby keeping its discharge end completely free from any structure that would interfere with free exit of conveyed materials from the trough. The invention also features novel structure in a supporting bracket that both engages a portion of a silo discharge opening to support the outer end of the trough and also receives one end of the torque arm. Another feature of the structure resides in the roller support means employed for the rear or inner end of the auger trough conveyor structure whereby the conveyor and the balance of the unloader may move with respect to each other easily. The protective shield or cover for the driving structure of the auger is also believed novel in matching the configuration of the trough with which the driving structure is used and being supported mainly by hooking to the trough.

It is a further object of this invention to provide a conveying structure for use in agricultural storage units or the like which imposes a minimum of wear and tear on the storage unit with which it is used.

Yet another object of this invention is to provide a material conveying structure which freely discharges the material being conveyed.

A still further object of this invention is to provide a silo unloader conveying structure which by reason of special supporting bracket and anti-friction support means for the rear end of the discharge conveyor imposes minimum wear on the cross bars of silo discharge openings and stress on the wall of the silo generally.

Another object of this invention is to provide a conveying structure in which parts are shielded in a manner providing ease of mounting and a good appearance.

It is a still further object of this invention to provide an auger conveyor in which the auger floats with the materials conveyed.

Still another object of this invention is to provide a silo unloader conveying mechanism support structure which, by reason of a low friction sliding connection between the conveyor and collector arm, allows easy movement of the unloader relative to the silo in which it is used.

Still other objects are those inherent in the specific structures shown in the drawings and described herein.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

The invention is illustrated by the drawings in which the same numerals refer to corresponding parts and in which:

FIGURE 2 is drawn to a larger scale than FIGURE 1 and broken lines illustrate hidden parts;

FIGURE 3 is drawn to the scale larger than FIGURE 2;

Figure 1:
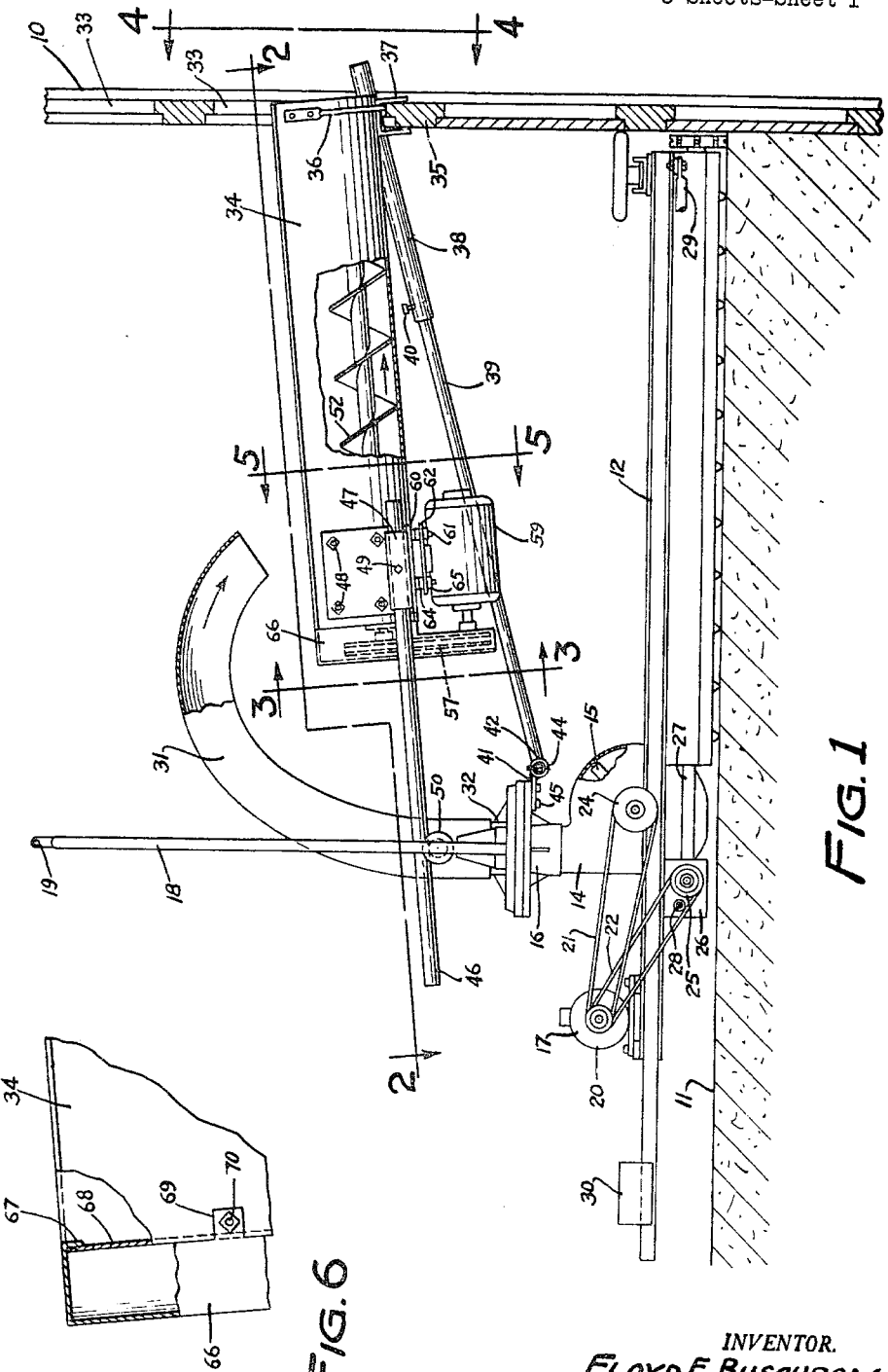
FIGURE 1 is a fragmentary side elevational view of a silo unloader and a sectional fragment of a silo with portions of the structure broken away to illustrate construction fully; broken lines illustrate hidden parts.
Figure 3:
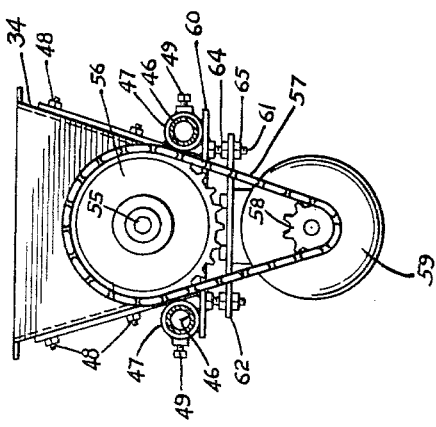
FIGURE 3 is an end elevation of the conveyor taken on line 3—3 of FIGURE 1 but with the shield for the drive means removed to illustrate the drive structure clearly.
Figure 4:
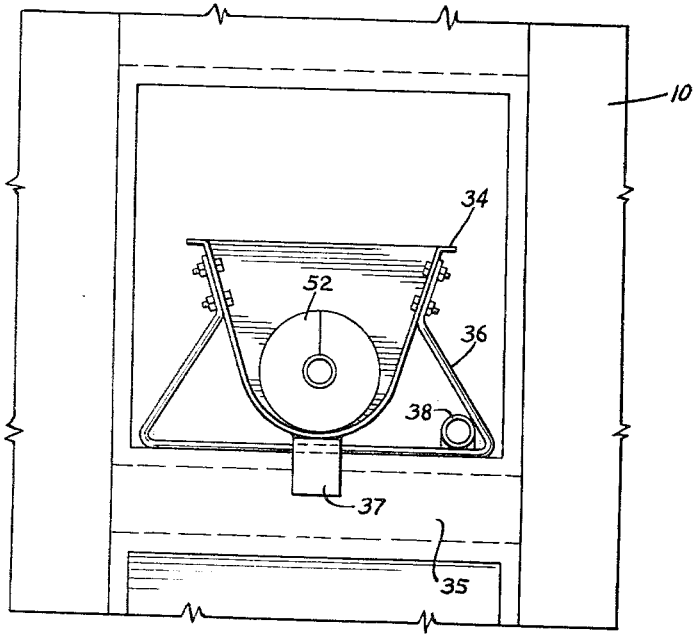
FIGURE 4 is an end elevation of the conveyor trough taken on line 4—4 of FIGURE 1 and drawn to the same scale as FIGURE 3; broken lines illustrate hidden parts.
Figure 5:
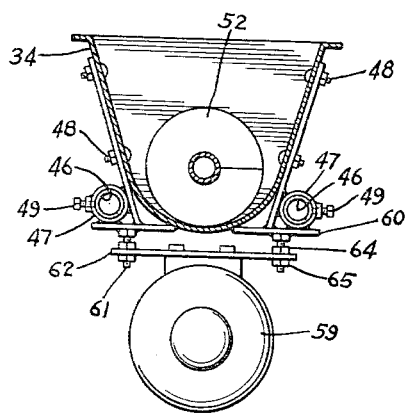

FIGURE 5 is a vertical section of the conveyor trough taken on line 5—5 of FIGURE 1 and drawn to the same scale as FIGURES 3 and 4; and FIGURE 6 is a fragmentary view of the upper rear portion of the discharge trough and the shielding for the auger drive with portions broken away to illustrate construction more fully; this figure is drawn to the same scale as FIGURES 3, 4 and 5 and broken lines are used to illustrate hidden parts.

With reference to the drawings, and specifically to FIGURE 1, the invention is shown as mounted inside a tower silo 10 containing the ensilage 11. A collector arm 12 is supported in operable position with reference to ensilage 11. Arm 12 is secured to the housing 14 of the impeller 15. Impeller housing 14 is rotatably secured to the ring structure 16, which rotatable connection also incorporates a sliding electrical contact so that power from an outside source may be supplied to motor 17. For the sake of clarity, power connections are omitted, although they may be as shown in Patent 2,794,560. Hanger 18 is suitably secured to the ring structure 16 and is provided at its top with an element 19 by means of which a suitable cable or the like may be attached to hanger 18 in order to suspend the entire structure inside of a silo in a manner generally disclosed in United States Patent 2,877,907 to which reference is made for a more detailed explanation.

Motor 17, by means of dual pulley 20 and belts 21 and 22 respectively, provides power to the impeller pulley 24 and the pulley 25 of gear box 26. Motor 17 via gear box 26 and shaft 27 operates the collecting portion of the collecting arm 12. Motor 17 also provides the power to drive the collector arm around the interior of the silo through structure such as that comparable to that shown in United States Patent 2,794,560 to which reference is made for more detailed description. Shaft 28 extends from gear box 26 to the driving structure which is also secured to the outer end of collector arm 12 as indicated by the fragmentary structure designated 29. Usual counterweight 30 aids in balancing the weight of collecting arm 12.

All of the structures described thus far are found in general type and are explained in detail in my United States Patents 2,794,560 and 2,877,907 to which reference is made for more detailed description.

Impeller 14 has paddles 15 which pick up ensilage delivered thereto by collector arm 12 and throws it upward through ring 16 and into chute 31. The chute 31 is suitably secured to a collar 32 that is part of ring structure 16. As is clearly shown in FIGURE 1, chute 31 arches up and out to discharge material impelled into it into the trough 34. Chute 31 may be of any suitable conduit type of configuration and here shown as an inverted trough of square U-shape in section.

Trough 34 when viewed in end elevation, is generally U-shaped with the legs of the U spread slightly at the top. Another way of stating the same thing is to refer to it as a blunt V-shape. Support for the outer end of trough 34 on the cross braces 35 of door openings 33 of silo 10 is provided by a special bracket 36 having the cross brace engaging member 37 secured to its center. As may be seen by viewing FIGURES 1 and 4 in conjunction, the cross brace engaging element 37 holds bracket 36 in alignment with the cross brace 35 and bracket 36 spreads the weight of the outer end of trough 34 across nearly the entire length of the cross brace 35. As will be noticed, again by comparing FIGURES 1 and 4, the bracket 36 also supplies a place of engagement or rest step for the outer portion 38 of torque arm 39.

The torque arm is composed of a pair of telescoping members having some means such as set screw 40 for securing them against movement with respect to each other. Arm 39 is secured in any suitable manner to ring structure 16 as by the bracket 41 having the sleeve 42 through which the rear end of torque arm 39 extends. Any suitable means such as cotter key 44 may be used to hold the torque arm within the sleeve 42. Bracket 41 is suitably secured to ring structure 16 as by the bolts 45.

Figure 2:
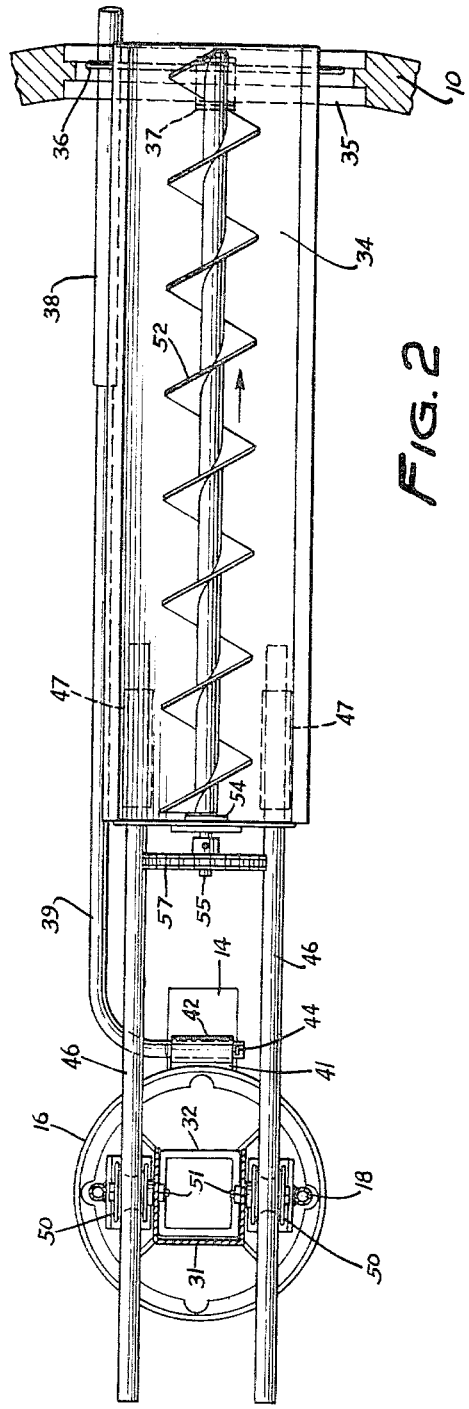
FIGURE 2 is a partial plan sectional view taken on line 2—2 of FIGURE 1.

The inside or rear end of the trough 34 is provided with support by means comprising the members 46 which slidably extend through brackets 47 that are suitably bolted as at 48 or otherwise secured to trough 34. Any suitable means such as set screws 49 secure the members 46 against slippage within brackets 47. The inner ends of members 46 rest on and may roll over the rollers 50. Rollers 50 are rotatably supported in any suitable manner on the central portion of the unloader. As shown, the bolt axles 51 extend through the rollers 50 and the sides of chute 31, as seen in FIGURE 2, which illustrates one such suitable means.

It will thus be seen that trough 34 is anchored to the outside edge of the silo by means of the cross piece gripping element 37 and is yieldingly secured to and supported by the friction reducing means on the central portion of the unloader. Furthermore, the torque arm 39 by engaging the bracket 36 resting on cross piece 35 of silo 10 serves to prevent rotation of the ring structure 16, chute 31 and trough 34 while collector arm 12, and its associated elements rotate while bringing ensilage from the outer edges toward the center of the silo.

Within trough 34 is a suitable conveying structure such as auger 52, and its shaft extension 55 is rotatably supported by a suitable bearing structure 54 in the end of trough 34. The bearing structure 54 is a conventional self-aligning bearing including a spherical race which enables it to compensate for limited movement of the auger shaft 55 without impairing the carrying capacity of the bearing. Shaft 55 has a sprocket gear 56 secured thereto and a sprocket chain 57 connects sprocket 56 to a sprocket 58 mounted on the shaft of motor 59.

As may be seen clearly in FIGURES 1, 3 and 5, motor 59 is secured to the plate 60 which is secured to trough 34 by the same plate and bolt structure that supports bracket 47. Motor 59 is made conveniently adjustable relative to shaft 53 by means of studs 61 secured to plate 60. These studs extend through suitable apertures in the motor base 62 and are clamped with respect to the motor base by nuts 64 and 65. By loosening the nuts 64 and tightening nut 65 motor 59 is moved closer to shaft 53 to reduce tension on chain 7. The reverse procedure increases tension thereon, as shown clearly in FIGURE 3.

As shown in FIGURES 2 and 4, auger 52 is unsupported at its outer end. Thus there are no bearing hangers or other structure in the path of materials being conveyed by auger 52 which would tend to inhibit it from free flow from the end of trough 34.

Torque arm 39 rests on bracket 36; it does not apply its reaction forces directly against any portion of the silo. This fact minimizes wear and damage to the silo cross pieces 35 and also provides support for torque arm 39 when the conveyor is moved from one discharge port to the next in the silo 10.

As seen in FIGURE 1 the sprockets and chain are covered by means of a shield designated 66. This shield may be readily secured to trough 34 in the manner illustrated in FIGURE 6 where the shield is seen to have a flange hook 67 that embraces the top edge of back panel 68 of trough 34. Ears such as the ones 69 engage the sides of trough 34 and are pierced. Trough 34 is pierced so as to match the hole in ears 69 and suitable means such as nut and bolt assembly 70 extends through these holes to hold shield 66 from moving with respect to trough 34 in a manner that would disengage hook 67. A majority of weight of the shield 66 is supported by hook 67. The shield has the same configuration on its upper portions as trough 34 and blends smoothly therewith to provide an easily mounted good look cover for the sprockets and chain.

It is apparent that many modifications and variations of this invention as hereinbefore set forth may be made without departing from the spirit and scope thereof. The specific embodiments described are given by way of example only and the invention is limited by the terms of the appended claims.

What is claimed:

1. A discharge conveyor for a silo unloader including trough means having an open top, a bottom section, an upright end wall and an open discharge end, said trough means positionable to receive ensilage discharged by a silo unloader adjacent the upright end wall thereof, an auger having a shaft positioned along the bottom section of the trough means, said auger having a diameter substantially less than the width of said trough means and a length substantially equal to the length of the trough means, said auger being operable to move ensilage along the bottom section through the open discharge end, a single bearing supported by said upright end wall, one end of said shaft rotatably supported in said bearing solely and projected through said upright end wall, said bearing having means allowing limited lateral and vertical movement of said auger relative to said trough means, the discharge end of the auger supported by engagement of the auger with the bottom section of the trough means, motor means secured to said trough means, power transmitting means coupling the motor means with the end of the shaft projected through the end wall whereby the motor means rotates the auger.

2. The discharge conveyor defined in claim 1 including a cover means for said power transmitting means, said cover means including a member conforming to the shape of said trough means in longitudinal projection and hook means engageable with the top edge of the upright end wall of said trough means for mounting the cover means on the trough means.

3. The discharge conveyor defined in claim 1 including cover means for said power transmitting means.

References Cited by the Examiner

UNITED STATES PATENTS

| | | | |
|---|---|---|---|
| 1,462,461 | 7/1923 | Caldwell | 214—17 |
| 1,905,342 | 4/1933 | Burton | 198—64 |
| 2,829,763 | 4/1958 | McCallum | 198—213 |
| 2,833,396 | 5/1958 | Knoedler | 214—17 |
| 2,883,076 | 4/1959 | Palmer | 214—17.8 |

SAMUEL F. COLEMAN, *Primary Examiner.*